United States Patent
Teraguchi et al.

(10) Patent No.: US 8,764,979 B2
(45) Date of Patent: Jul. 1, 2014

(54) NON-PARTICULATE ORGANIC POROUS MATERIAL HAVING OPTICAL RESOLUTION CAPABILITY AND METHOD FOR MANUFACTURING SAME

(75) Inventors: Masahiro Teraguchi, Niigata (JP); Takashi Kaneko, Niigata (JP); Toshiki Aoki, Niigata (JP); Hiroshi Inoue, Tokyo (JP); Akiko Yoshida, Tokyo (JP)

(73) Assignee: ORGANO Corporation, Tokyo (JP)

( * ) Notice: Subject to any disclaimer, the term of this patent is extended or adjusted under 35 U.S.C. 154(b) by 1974 days.

(21) Appl. No.: 11/686,050

(22) Filed: Mar. 14, 2007

(65) Prior Publication Data

US 2007/0155860 A1 Jul. 5, 2007

Related U.S. Application Data

(62) Division of application No. 10/937,770, filed on Sep. 10, 2004, now abandoned.

(30) Foreign Application Priority Data

Jan. 16, 2004 (JP) ................. 2004-009426

(51) Int. Cl.
*B01D 15/08* (2006.01)
*B01D 15/38* (2006.01)
*B01D 39/16* (2006.01)

(52) U.S. Cl.
CPC ........ *B01D 15/3852* (2013.01); *B01D 15/3833* (2013.01); *B01D 39/1676* (2013.01)
USPC ...... 210/198.2; 210/635; 210/656; 210/502.1

(58) Field of Classification Search
CPC ................. B01D 15/3852; B01D 15/3833; B01D 39/1676
USPC ............................ 210/635, 656, 198.2, 502.1
See application file for complete search history.

(56) References Cited

U.S. PATENT DOCUMENTS

| 5,081,160 A | 1/1992 | Strom et al. |
| 5,461,175 A | 10/1995 | Fischer et al. |
| 5,683,800 A | 11/1997 | Stringfield et al. |

(Continued)

FOREIGN PATENT DOCUMENTS

| JP | 62-67056 | 3/1987 |
| JP | 6-262069 | 9/1994 |

(Continued)

OTHER PUBLICATIONS

PTO Translation No. 06-3298 of Japan Patent No. 2000-515627, Mar. 2006.*

(Continued)

*Primary Examiner* — Ernest G Therkorn
(74) *Attorney, Agent, or Firm* — Oblon, Spivak, McClelland, Maier & Neustadt, L.L.P.

(57) ABSTRACT

A non-particulate organic porous material with optical resolution capability, the non-particulate organic porous material having a continuous pore structure, which comprises macropores and mesopores, the macropores being interconnected forming mesopores with a radius of 0.01-100 μm in the interconnected parts, and optically active groups uniformly introduced therein possesses high physical stability, can be used under wide separating conditions, and has a large capacity for separating optically active substances (enantiometers).

15 Claims, 1 Drawing Sheet

(56) References Cited

U.S. PATENT DOCUMENTS

| | | |
|---|---|---|
| 5,728,457 A | 3/1998 | Frechet et al. |
| 5,916,445 A | 6/1999 | Hjerten et al. |
| 6,251,280 B1 | 6/2001 | Dai et al. |
| 6,274,686 B1 | 8/2001 | Mosbach et al. |
| 6,310,110 B1 | 10/2001 | Markowitz et al. |
| 6,398,962 B1 | 6/2002 | Cabrera et al. |
| 6,562,744 B1 | 5/2003 | Nakanishi et al. |
| 6,709,597 B1 | 3/2004 | Mannepalli et al. |

FOREIGN PATENT DOCUMENTS

| | | |
|---|---|---|
| JP | 2000-88827 | 3/2000 |
| JP | 2000-515627 | 11/2000 |
| JP | 2002-306976 | 10/2002 |
| JP | 2003-246809 | 9/2003 |

OTHER PUBLICATIONS

PTO Translation No. 06-3278 of Japan Patent No. 2002-306976, Mar. 2006.*

\* cited by examiner

NON-PARTICULATE ORGANIC POROUS MATERIAL HAVING OPTICAL RESOLUTION CAPABILITY AND METHOD FOR MANUFACTURING SAME

This application is a Divisional application of U.S. Ser. No. 10/937,770, Sep. 10, 2004 now abandoned.

TECHNICAL FIELD

The present invention relates to a non-particulate organic porous material having optical resolution capability that can separate enantiomers, and a method for manufacturing the same.

BACKGROUND ART

Many compounds with a chiral molecular structure that contain enantiomers are physiologically active and important as raw materials of drugs, agricultural chemicals, and food additives. In general, many enantiomers have completely different physiology activities from enantiomers of the same constituent elements in the same proportion by weight. For example, in the case of thalidomide, the R(−) enantiomer has a sedative effect and the S(−) enantiomer is teratogenic. For this reason, there has recently been an increasing demand for optical resolution of enantiomers, particularly in the pharmaceutical industry.

As the method for optical resolution of enantiomers, a preferential crystallization method in which one of the enantiomers is preferentially crystallized, a diastereomer method comprising causing a racemic isomer to react with another optically active substance to produce diastereomers and separating the resultant diastereomers by differences in crystallization properties, solubility in a solvent, and the like, a method of separating enantiomers by gas chromatography or high performance liquid chromatography using an adsorbent with a asymmetric structure as a stationary phase, a biochemical method of separating enantiomers utilizing the asymmetric discrimination capability of living bodies such as a digestive function and enzymatic, asymmetric hydrolysis, and the like.

Among these methods, the method of using chromatography is widely accepted due to the simple operation and the wide applicability to resolvable racemic isomers. Many types of adsorbents with an asymmetric structure used for the chromatography method are known, most of which are in the form of fine particles with a 10 µm or less particle size that can achieve a high theoretical plate number. This use of fine particles requires a significantly high operating pressure that may lead to deterioration of the separation performance during continuous operation for a long period of time as these adsorbents exhibit poor physical stability.

Published Japanese translation of PCT Application No. 2000-515627 discloses a chiral sorbent having a molded porous ceramic or a molded porous polyamide hollow fiber membrane as a substrate, in which the molded porous ceramic has macropores and mesopores, wherein the macropores are interconnected forming mesopores in the interconnected parts, the macropores have a median diameter greater than 0.1 µm, and the mesopores have a median diameter in the range of 2-100 nm. Enantiomers can be separated at a high flow rate by using these chiral sorbent in column chromatography.

Japanese Patent Application Laid-Open No. 2002-306976 discloses a porous ion exchange material having a continuous pore structure comprising macropores and mesopores (the macropores being interconnected forming mesopores with an average diameter of 1-1,000 µm in the interconnected parts), and having a total pore volume of 1-50 ml/g, uniformly distributed ion exchange groups, and an ion exchange capacity of 0.5 mg-equivalence/g or more on a dry basis. The pore volume and specific surface area of this organic porous ion exchange material are extremely large.

However, the chiral sorbent having a molded porous ceramic as a substrate disclosed in the Published Japanese translation of PCT Application No. 2000-515627 has a drawback of restrained separation conditions due to its unstable properties in alkalis, whereas the chiral sorbent having a molded porous polyamide hollow fiber membrane as a substrate allows only a small theoretical plate number, making it difficult to achieve precise separation. In addition, optical activity recognizing sites are introduced only to the surface, but can be introduced neither inside the skeletons of the inorganic molded porous ceramic material nor inside the polyamide hollow fiber membrane. These sorbents have, therefore, only a small adsorption capacity and are unsuitable for separation and purification of a large amount of enantiomers. The organic porous material having a continuous porous structure disclosed in the Japanese Patent Application Laid-Open No. 2002-306976, on the other hand, has been developed with an objective of using this material as an ion exchanger. There is no description in the patent specification regarding the use of this material as an adsorbent to separate enantiomers.

An object of the present invention is therefore to solve the above-mentioned shortcomings of the prior art. Specifically, an object of the present invention is to provide a non-particulate organic porous material possessing high physical stability, usable under wide separating conditions, and having a large adsorption capacity and to provide a method for manufacturing the same.

DISCLOSURE OF THE INVENTION

In view of this situation, the present inventors have conducted extensive studies. As a result, the inventors have found that a non-particulate organic porous material having a specific structure can uniformly introduce optically active groups inside its continuous porous structure and, therefore, can produce an adsorbent exhibiting excellent performance to separate optically active substances without restraining separation conditions and, the inventors have also found surprisingly, that spatial recognizing sites remain even after elimination of the optically active groups from the adsorbent, allowing the non-particulate organic porous material to maintain the excellent capability of separating optically active substances.

Specifically, the present invention (1) is to provide a non-particulate organic porous material with optical resolution capability, the non-particulate organic porous material having a continuous pore structure, which comprises macropores and mesopores, the macropores being interconnected forming mesopores with a radius of 0.01-100 µm in the interconnected parts, and optically active groups uniformly introduced therein (hereinafter referred to as "first non-particulate organic porous material").

The present invention (2) is to provide a non-particulate organic porous material having optical resolution capability obtained by eliminating a part or all of the optically active groups from the first non-particulate organic porous material (hereinafter referred to as "second non-particulate organic porous material").

The present invention (3) provides a method for manufacturing the first non-particulate organic porous material comprising preparing a mixture of an oil-soluble monomer containing optically active groups, a surfactant, and water, stirring the mixture to prepare a water-in-oil-type emulsion, and allowing the mixture to stand to polymerize the monomer.

The present invention (4) provides a method for manufacturing the second non-particulate organic porous material comprising preparing a mixture of an oil-soluble monomer containing optically active groups, a surfactant, and water, stirring the mixture to prepare a water-in-oil-type emulsion, allowing the mixture to stand to polymerize the monomer, and causing a part or all of the optically active groups to be eliminated.

Since the non-particulate organic porous material of the present invention has high physical stability, can be used under a wide variety of separating conditions, and possesses an excellent capability of separating optically active substances, the material is free from the shortcomings to the conventional optical resolution columns, such as limited separation performance and poor stability and, at the same time, exhibits high separating performance. Therefore, the non-particulate organic porous material is expected to contribute to downsizing of columns or enlarging the capacity for enantiomer resolution. In addition, since optically active groups or spatial recognizing sites can be introduced not only onto the surface of the non-particulate organic porous material, but into the inside of the skeleton area of the porous material according to the method for manufacturing the non-particulate organic porous material of the present invention, a non-particulate organic porous material with a large adsorption capacity and suitable for a large scale separation and purification can be obtained.

DETAILED DESCRIPTION

Figure 1:
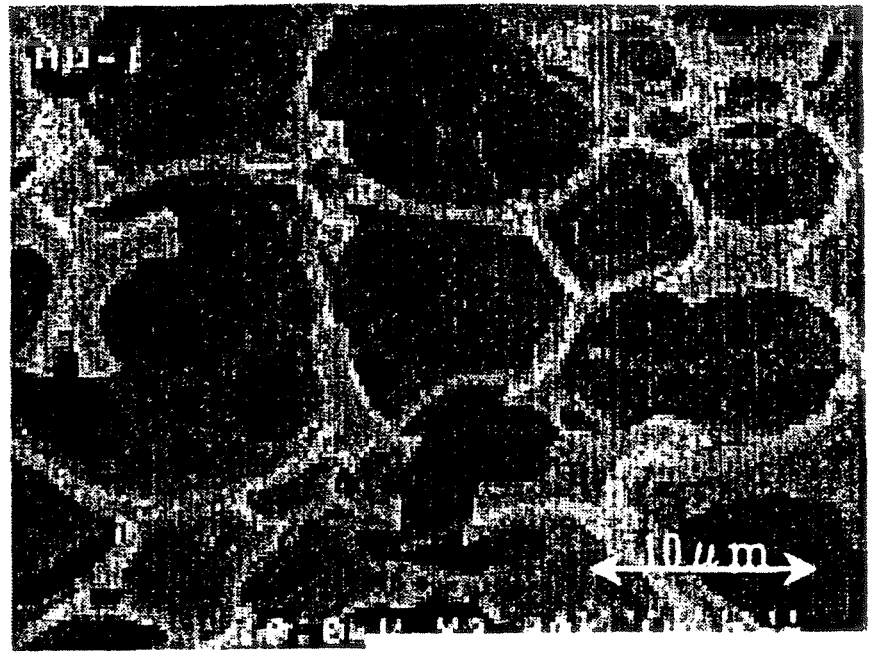
FIG. 1 is an SEM photograph of the organic porous material obtained in Example 1.

The basic structure of the first and second non-particulate organic porous materials is a continuous pore structure having macropores and mesopores, the macropores being interconnected forming mesopores with an average radius of 0.01-100 μm, and preferably 0.1-10 μm, in the interconnected parts. Specifically, the continuous pores usually have a structure in which macropores with a radius of 0.2-500 μm are layered and the layered section has mesopores functioning as common openings, providing an open pore structure. In the open pore structure, pores formed from the macropores and mesopores become flow paths for a liquid. The overlapped macropores usually have 1-12 layers of macropores, with many having 3-10 layers of macropores. Mesopores with a radius of less than 0.01 μm are undesirable because the mesopores with a small radius unduly increase the pressure loss during passage of a liquid.

On the other hand, the radius of mesopores exceeding 100 μm is undesirable because the liquid does not contact the non-particulate organic porous material sufficiently, giving rise to a tendency of non-uniform diffusion of the liquid phase in a packed bed of the porous material, which results in a decrease in the resolution performance. In addition to the above-described continuous pore-type non-particulate porous material, there is a particle aggregated-type porous material, as disclosed in F. Svec, Science, 273, 205-211 (1996) and other publications. Since the porous material obtained by this method has a small pore volume and an insufficient mesopore size due to the particle aggregation-type structure, this type porous material is subject to restrictions in minimizing the pressure of feed liquid flow.

In the first and second non-particulate organic porous materials, those having non-continuous micropores with an average radius of 5-800 nm additionally formed in the pore structure inner wall formed from the above-mentioned macropores and mesopores, if used as a packaging material of columns, can synergistically utilize the separating effect according to the size of the measuring object component, in addition to the separating effect according to the asymmetry selectivity. This type is advantageous for increasing the resolution performance in separation and quantitative determination of a high molecular weight biological-related substance such as a nucleic acid or a protein.

In the first and second non-particulate organic porous materials of the present invention, it is preferable that the value (W/R) obtained by dividing the half-width (W) of the pore distribution curve at the main peak by the radius (R) at the main peak be 0.5 or less. The pore distribution curve is determined by the mercury porosimetry method. For a main peak having a height H from the base line of the pore distribution curve, the half-width of the pore distribution curve at the main peak indicates the width at the height of H/2 from the base line of the pore distribution curve. The smaller the value (W/R), the sharper the pore distribution. In the non-particulate organic porous materials of the present invention, if the value (W/R) is 0.5 or less, macropore groups and mesopore groups forming the continuous pore structure are uniformly present, resulting in a sharp mesopore distribution, which in turn remarkably increases the resolution performance. In addition, since such a structure contains no macrovoids which are structural defective sites, the resulting product has increased physical strength and improved durability against swelling and shrinkage.

Therefore, the non-particulate organic porous materials with a value (W/R) of 0.5 or less exhibits outstanding improvement in the performance as well as in the functions over the non-particulate organic porous material with the same composition and structure but having the value (W/R) exceeding 0.5.

In addition, the first and second non-particulate organic porous materials have a total pore volume of 1-50 ml/g. If the total pore volume is less than 1 ml/g, the amount of liquid permeating through a unit area becomes small, resulting in reduced permeation under low pressure. On the other hand, a total pore volume of more than 50 ml/g is undesirable because the non-particulate organic porous material has very poor physical strength. Columns packed with conventional particulate fillers have a void volume of 0.1-0.2 ml/ml packed bed volume (a liquid volume that permeates through the packed bed), whereas the non-particulate organic porous material of the present invention, which has the above-mentioned continuous porous structure completely different from the conventional packed particle bed, has a total pore volume as much as 1-50 ml/g. Therefore, it is possible to feed liquid at a pressure as low as 1/2-1/30 of the conventional feed fluid pressure without impairing the resolution performance or reducing the flow rate.

When water is used as a typical liquid permeating through the first or second non-particulate organic porous material with a thickness of 10 mm, the rate of permeation should preferably fall within a range of 100-100,000 l/min·m$^2$·MPa. If the permeation rate and the total pore volume are in the above ranges, the organic porous material can exhibit excellent performance due to the large liquid contact area, smooth passage of the liquid, and robust mechanical strength.

In the first and second non-particulate organic porous materials, the material for the matrix forming the continuous pores is an organic polymer having a crosslinking structure. The polymer preferably contains crosslinking structural units in the amount of 1 mol % or more of the total amount of all structural units forming the polymer. If the content of the crosslinking structural units is less than 1 wt %, the mechanical strength leaves much to be desired.

There are no specific limitations to the type of the polymer material for the matrix forming the continuous pore structure. Examples of the polymer material include styrenic polymers such as polystyrene poly($\alpha$-methylstyrene), and poly(vinyl benzyl chloride); polyolefins such as polyethylene and polypropylene; halogenated polyolefins such as polyvinyl chloride and polytetrafluoroethylene; nitrile-containing polymers such as polyacrylonitrile; (meth)acrylic polymers such as poly(methyl methacrylate) and poly(ethyl acrylate); and a styrene-divinylbenzene copolymer. The above polymers may be either homopolymers obtained by polymerizing one type of monomer or copolymers obtained by polymerizing two or more types of monomers. In addition, a blend of two or more polymers may be used. Among these organic polymers, styrene-divinylbenzene copolymer and vinyl benzyl chloride-divinylbenzene copolymer are preferable in view of ease of introduction of optically active groups and high mechanical strength. The continuous pore structure of the non-particulate organic porous material of the present invention can be easily observed using a scanning electron microscope (SEM) Pore diameters of macropores and mesopores can also be observed by SEM.

Optically active groups are uniformly introduced into the first non-particulate organic porous material of the present invention in an amount of preferably at least 0.1 mmol/g, and particularly preferably 0.5-50 mmol/g. If the amount of the optically active groups introduced is less than 0.1 mmol/g, the optical resolution capacity decreases. In a conventional porous material, since optically active recognizing sites are introduced only onto the surface excluding the inside of the skeleton structure, the adsorption capacity remains low. On the other hand, since optically active groups can be uniformly introduced into the inside of the skeleton of the continuous porous structure of the porous material according to the present invention, the adsorption capability is upgraded, which enables the optical resolution process to be easily scaled up to the industrial level. The introduced optically active groups can be qualitatively and quantitatively analyzed by measuring the characteristic absorption of the functional groups in the optically active groups by IR spectra.

Although there are no specific limitations to the optically active groups introduced into the first non-particulate organic porous material, amino acids and their derivatives such as L-proline; optically active crown ethers; cyclodextrin and its derivatives; groups having asymmetrical carbon atoms such as a pinanyl group and menthoxyl group; optically active naturally occurring polymers such as cellulose, amylose, serum albumin, ovomucoid, and cellulose; and optically active synthetic polymers in which the main chain has a spiral structure such as polymethacrylic acid esters and stereoregular polyphenyl acetylene, and the like can be given as examples. Among these, the groups having asymmetrical carbon atoms such as a pinanyl group and menthoxyl group are preferable in view of their capability of being comparatively easily introduced into a non-particulate organic porous material and the high chiral recognition characteristics. The optically active groups can be uniformly introduced not only onto the surface of the first non-particulate porous material, but also into the inside of the skeleton area forming the porous structure. The term "uniform distribution of optically active groups" herein denotes uniformity of optically active group distribution in the order of $\mu$m or less. Distribution conditions of the optically active groups can be identified comparatively easily using an analytical technique such as EPMA, SIMS, or the like.

The second non-particulate organic porous material of the present invention can be obtained by eliminating a part or all of the optically active groups from the first non-particulate organic porous material. Elimination of the optically active groups creates chiral cavities which are the spatial recognizing sites for any optically active substance. The chiral cavities are introduced not only into the surface, but also into the inside of the skeleton of the non-particulate organic porous material, in an amount of at least 0.1 mmol/g, and particularly preferably 0.5-50 mmol/g. If the amount of the chiral cavities is less than 0.1 mmol/g, the optical resolution capacity decreases. Retention of the optical resolution capability after removing the optically active groups can be explained as an imprinting effect of the spatial recognizing sites. It is surprising that the second non-particulate organic porous material which has the chiral cavities exhibits increased adsorption and selectivity as compared with the first non-particulate organic porous material. The first and second non-particulate organic porous materials are useful as adsorbents used in column chromatography to separate enantiomers.

Next, a method for manufacturing the first non-particulate organic porous material of the present invention is described. The first non-particulate organic porous material can be manufactured by preparing a mixture of an oil-soluble monomer containing optically active groups, a surfactant, and water, stirring the mixture to prepare a water-in-oil-type emulsion, and allowing the mixture to stand to polymerize the monomer.

One example of the process for manufacturing the first non-particulate organic porous material will now be described. Specifically, the process comprises preparing a water-in-oil type emulsion by mixing an oil-soluble monomer containing optically active groups, a surfactant, water, and as required, a crosslinkable monomer and a polymerization initiator, and polymerizing the water-in-oil type emulsion.

The oil-soluble monomer containing optically active groups is a lipophilic monomer containing optically active groups such as a pinanyl group and methoxyl group, and having low solubility in water. As specific examples of such monomers, p-pinanyldimethylsilylstyrene, p-menthoxycarbonylstyrene, p-pinanyldimethylsilyl-$\alpha$-methylstyrene, p-menthoxycarbonyl-$\alpha$-methylstyrene, pinanyldimethylsilylmethyl acrylate, pinanyldimethylsilylethyl acrylate, pinanyldimethylsilylmethyl methacrylate, pinanyldimethylsilylethyl methacrylate, menthyl acrylate, menthyl methacrylate, and the like can be given. These monomers may be used either individually or in combination of two or more However, to obtain the necessary mechanical strength as an adsorbent or a packing material for separation, it is desirable to select a crosslinking monomer such as divinylbenzene, ethylene glycol dimethacrylate, or butanediol diacrylate, and to incorporate such a monomer in an amount of 0.5-90 mol %, preferably 1-80 mol % of the total amount of the oil-soluble monomers containing the optically active groups, thereby copolymerizing the monomers.

There are no specific limitations to the types of the surfactant inasmuch as a water-in-oil (w/o) type emulsion can be formed when the oil-soluble monomer containing optically active groups is mixed with water. Nonionic surfactants such as sorbitan monooleate, sorbitan monolaurate, sorbitan monopalmitate, sorbitan monostearate, sorbitan trioleate, polyoxyethylene nonyl phenyl ether, polyoxyethylene stearyl ether, and polyoxyethylene sorbitan monooleate; anionic surfactants such as potassium oleate, sodium dodecylbenzene sulfonate, and dioctyl sodium sulfosuccinate; cationic surfactants such as distearyl dimethyl ammonium chloride; and amphoretic surfactants such as lauryl dimethyl betaine can be used as the surfactant. These surfactants may be used either individually or in combination of two or more. The "water-in-oil emulsion" refers to an emulsion having a continuous oil phase in which water droplets are dispersed. Although the amount of the above surfactant to be added significantly varies according to the type of oil-soluble monomer and the size of the target emulsion particles (macropores), a specific amount can be selected in the range of about 2% to 70% of the total amount of the oil-soluble monomer and the surfactant.

A compound that generates radicals by heat or light is suitably used as the polymerization initiator. The polymerization initiator may be either water-soluble or oil-soluble. Examples of the initiator include azobisisobutyronitrile, azobisdimethylvaleronitrile, azobiscyclohexanenitrile, azobiscyclohexanecarbonitrile, benzoyl peroxide, potassium persulfate, ammonium persulfate, hydrogen peroxide-iron chloride, sodium persulfate-acidic sodium sulfite, and tetramethylthiuram disulfide. In some reaction systems, polymerization proceeds only by heat or light even if the polymerization initiator is not added. In such a case, the polymerization initiator need not be added.

As the method for preparing a water-in-oil-type emulsion by mixing the oil-soluble monomer containing optically active groups, a surfactant(s), water, a crosslinkable monomer, and a polymerization initiator, a method of mixing these components all together, a method of preparing a mixture of oil-soluble components, which include an oil-soluble monomer, a crosslinkable monomer, a surfactant(s), and an oil-soluble polymerization initiator, and a solution of aqueous components, which includes water and a water-soluble polymerization initiator, and mixing the mixture and solution, and other similar methods can be used. A known precipitant may be added as required. The precipitant is a compound functioning as a poor solvent to the polymer produced by the polymerization of the oil-soluble monomer containing the optically active groups and capable of dissolving the oil-soluble monomer containing the optically active groups. This is used when it is desired additionally to form non-continuous micropores with an average pore size of 5-800 nm in the pore structure inner wall formed from the macropores and mesopores.

As a mixing apparatus for forming the emulsion, a sun-and-planet type mixer can be used. The materials to be processed are filled into this mixing container, which is held inclined and caused to move around a revolution axis while being rotated, thereby mixing the materials. The sun-and-planet type mixer is a type of apparatus disclosed in Japanese Patent Application Laid-Open No. 6-71110 and Japanese Patent Application Laid-Open No. 11-104404, for example. The principle of the apparatus is to cause a mixing vessel itself to rotate while causing it to rotate around a revolution axis, whereby heavier components (components having greater specific gravities) in the processed materials are shifted to the outside, thereby stirring the materials by utilizing centrifugal force, and, at the same time, bubbles mixed in the liquid are pushed in the reverse direction, thereby defoaming the materials. In addition, since the vessel itself rotates while being rotated around a revolution axis, spiral flows (whirling flows) are generated in the processed materials in the vessel, whereby stirring action is promoted. Although the apparatus may be operated under atmospheric pressure, operation under reduced pressure is more preferable to completely deform the materials in a short period of time.

The mixing conditions such as rate of revolution, rate of rotation, and stirring time can be arbitrarily determined so that the target particle size and distribution of the emulsion can be attained. The desirable rate of revolution varies according to the size and shape of the vessel, but is usually about 500-2,000 revolutions/min. A desirable rate of rotation is about one third ($\frac{1}{3}$) the rate of revolution. Although the stirring time should also significantly vary according to the properties of the processed materials, as well as shape and size of the vessel, usually a period of time in the range of 0.5-30 minutes, and preferably 1-20 minutes is set. A vessel having a configuration allowing the processed materials to be filled into the vessel so that the ratio of the bottom diameter to the height of the filled materials becomes 1:0.5-1:5 is preferably used. The mixing ratio by weight of the above oil-soluble components and the water-soluble components can be arbitrarily determined in the range of 2:98-50:50, and preferably 5:95-30:70.

Various polymerization conditions can be selected for polymerizing the water-in-oil emulsion thus obtained according to the types of the monomer and the polymerization initiator. For example, when azobisisobutyronitrile, benzoyl peroxide, potassium persulfate, or the like is used as the polymerization initiator, the emulsion may be polymerized by heating at 30-100° C. for 1-48 hours in a sealed vessel in an inert atmosphere. When hydrogen peroxide-iron chloride, sodium persulfate-acidic sodium sulfite, or the like is used as the polymerization initiator, the emulsion may be polymerized at 0-30° C. for 1-48 hours in a sealed vessel in an inert gas atmosphere. After the polymerization, the reaction mixture is removed from the reaction vessel and, if necessary, extracted with a solvent such as isopropanol to remove the unreacted monomer and the surfactant, thereby yielding an organic porous material. In the polymerization reaction, oil components in the water-in-oil type emulsion polymerize to form a matrix and water droplets becomes pores.

The polymerization of monomers with optically active groups introduced therein ensures uniform introduction of optically active groups not only onto the surface, but also into the inside of the skeleton structure of the non-particulate organic porous material. Generally, it has been known in the field of optical resolution that in addition to the space structure control using optically active groups, the structure control effected in the neighborhood of optically active groups by the networks of gels and polymers is important to increase the optical resolution performance. The high optical resolution performance of the non-particulate organic porous material of the present invention is considered to be due to uniform introduction of the optically active groups inside the skeleton structure, whereas there is a limitation to the enhancement of performance by the non-particulate porous material in the prior art due to introduction of optically active groups only onto the surface.

Next, a method for manufacturing the second non-particulate organic porous material of the present invention is described. The method for manufacturing the second non-particulate organic porous material comprises preparing a mixture of an oil-soluble monomer containing an optically active group, a surfactant, and water, stirring the mixture to prepare a water-in-oil-type emulsion, allowing the mixture to stand to polymerize the monomer, and causing the optically active group to be eliminated. That is, the second non-particulate organic porous material can be obtained by eliminating a part or all of the optically active groups from the first non-particulate organic porous material.

Since the steps of preparing a water-in-oil-type emulsion by stirring the mixture of treated materials and polymerizing the monomers while allowing the mixture to stand in the method for manufacturing the second non-particulate organic porous material are the same as in the method for manufacturing the first non-particulate organic porous material, detailed description of the method is omitted. However, to increase the imprinting effect by stabilizing the structure of the chiral cavities produced after elimination of the optically active groups in the method of manufacturing the second non-particulate organic porous material, it is desirable to set the amount of crosslinking and copolymerizing monomers at a high level of 1-90 mol %, and preferably 5-80 mol % of the total amount of the oil-soluble monomers containing the optically active groups.

To eliminate a part or all of the optically active groups which combine with the organic polymer via a carbon-silicon bond, for example, a method of using trifluoroacetic acid to quantitatively cut the carbon-silicon bonds may be used. Specifically, a method of cleaving the carbon-silicon bond by reacting the organic polymer having the optically active groups introduced therein with trifluoroacetic acid in an organic solvent such as n-hexane and dichloroethane can be cited. There are no specific limitations to the reaction conditions. For example, the reaction may be carried out at room temperature or with heating for a period of one hour to five days. When the optically active group and the organic polymer bond together through an ester bond, an amide bond, a urethane bond, an urea bond, or the like, the bonds can be quantitatively cut by hydrolysis in the presence of an acid catalyst or base catalyst. As examples of the acid catalyst, hydrochloric acid, sulfuric acid, and toluenesulfonic acid can be cited. As examples of the base catalyst, sodium hydroxide, potassium hydroxide, and tetramethylammonium hydroxide can be given. There are no specific limitations to the hydrolysis conditions. For example, the reaction may be carried out at room temperature or with heating for a period of one hour to five days.

The present invention will be described in more detail by examples, which should not be construed as limiting the present invention.

PREPARATION EXAMPLE 1

Preparation of 4-(−)-pinanyldimethyl silylstyrene (Abbreviated to (−)-PSSt)

28.4 g of p-dibromobenzene was dissolved in diethyl ether, and 51.3 g n-butyl lithium was added to react with p-dibromobenzene at 0° C. Then, 31.2 g of (−)-pinanyldimethylsilyl chloride was added and reacted. A mixture obtained after a routine process was purified by distillation under reduced pressure to obtain 1-bromo-4-(−)-pinanyldimethylsilylbenzene. After dissolving 34.85 g of the obtained 1-bromo-4-(−)-pinanyldimethylsilylbenzene in diethyl ether, 42.4 g of n-butyl lithium and 6.9 g of dimethylformamide were successively added and the mixture was reacted. After processing by a routine method, the reaction mixture was purified by silica gel column chromatography to obtain 27.4 g of 4-(−)-pinanyldimethylsilylbenzaldehyde. After dissolving the obtained aldehyde in 200 ml of tetrahydrofuran, the solution was added to a solution of 36.9 g of methyltriphenyl iodide and 40.0 g of n-butyl lithium to obtain (−)-PSSt. The (−)-PSSt was purified by column chromatography using hexane as a developing solvent to obtain 15.0 g of purified (−)-PSSt. The structure was confirmed using NMR and IR.

PREPARATION EXAMPLE 2

Preparation of (−)-menthyl 4-vinylbenzoate (Abbreviated to (−)-MtSt)

14.8 g of 4-vinylbenzoic acid was dissolved in methylene chloride and reacted with 15.6 g of (−)-menthol, using an N,N'-dicyclohexyl carbodiimide as a condensing agent to obtain (−)-MtSt. The (−)-MtSt was purified by silica gel column chromatography using a hexane/ethyl acetate mixture (19/1) as a developing solvent to obtain 20.3 g of purified (−)-MtSt. The structure was confirmed using NMR and IR.

EXAMPLE 1

Preparation of Non-Particulate Organic Porous Material Having Optically Active Groups by Introducing (−)-pinanyldimethylsilyl groups 6.8 g of (−)-PSSt, 2.9 g of divinylbenzene, 1.1 g of sorbitan monooleate, and 0.10 g of azobis-iso-butylonitrile were mixed. A container for emulsion preparation was charged with the mixture and 97 g of deionized water. The resultant mixture was stirred using a sun-and-planettype stirrer (vacuum agitation defoaming mixer, manufactured by EME Co., Ltd.) at a reduced pressure of 13.3 kPa, at a revolution rate (rotation around a revolution axis) of 2,000 rpm, and at a rotation of 600 rpm for 2.5 minutes to obtain a water-in-oil emulsion. After the emulsification, the reaction system ambience was sufficiently replaced with nitrogen and the emulsion was sealed and allowed to stand to polymerize at 60° C. for 24 hours. After the polymerization, the reaction mixture was extracted with isopropanol for 18 hours using a Soxhlet extractor to remove unreacted monomers, water, and sorbitan monooleate, and dried overnight at 85° C. under reduced pressure. The weight of the organic porous material after drying was 9.5 g, and the yield was 98%. From the facts that the absorption peaks characteristic of SiC—H (1250 cm$^{-1}$) and Si—CH$_3$ (1116 cm$^{-1}$) were seen in the IR spectra of the resulting organic porous material and that the yield was quantitative, the optically active groups were confirmed to have been quantitatively introduced into the organic porous material in an amount of 19.5 mmol/g.

The inner structure of the organic porous material of the (−)-PSSt/divinylbenzene copolymer containing optically active groups introduced therein was inspected by SEM. The results are shown in FIG. 1. As is clear from FIG. 1, the organic porous material has a continuous porous structure and contains macropores and mesopores, respectively having a uniform size. In addition, the pore distribution curve of the organic porous material determined by the mercury porosimetry method was sharp. The radius (R) of a peak of the pore distribution curve was 2.8 μm, the half-width (W) of the peak was 1.1 μm, and the value (W/R) obtained by dividing the half-width by the radius of the peak was 0.40. The total pore volume of the organic porous material was 9.7 ml/g. To confirm the presence or absence of macrovoids, the organic porous material was cut and the inner conditions were observed by the naked eye. There were no macrovoids observed at all.

EXAMPLE 2

Preparation of Non-Particulate Organic Porous Material Having Optically Active Groups by Introducing (−)-Methoxycarbonyl Groups 11.7 g of (−)-MtSt, 1.3 g of divinylbenzene, 2.6 g of sorbitan monooleate, and 0.26 g of azobis-iso-butylonitrile were mixed. A container for emulsion preparation was charged with the mixture and 130 g of deionized water. The mixture was stirred using a sun-and-planettype stirrer (vacuum agitation defoaming mixer, manufactured by EME Co., Ltd.) at a reduced pressure of 13.3 kPa, at a revolution rate (rotation around a revolution axis) of 2,000 rpm, and at a rotation of 600 rpm for 2.5 minutes to obtain a water-in-oil emulsion. After the emulsification, the reaction system ambience was sufficiently replaced with nitrogen and the emulsion was allowed to stand to polymerize at 60° C. for 24 hours. After the polymerization, the reaction mixture was extracted with acetone for 18 hours using a Soxhlet extractor to remove unreacted monomers, water, and sorbitan monooleate, and dried overnight at 85° C. under reduced pressure. The weight of the organic porous material after drying was 13.0 g, and the yield was 100%. From the facts that the absorption peak characteristic to an aromatic ester (1720 cm$^{-1}$) was seen in the IR spectra of the resulting organic porous material and that the yield was quantitative, the optically active groups were confirmed to have been quantitatively introduced into the organic porous material in an amount of 3.2 mol/g.

The inner structure of the organic porous material of (−)-MtSt/divinylbenzene copolymer thus obtained was the same continuous porous structure with the same uniformly sized macropores and mesopores as the organic porous material of (−)-PSSt/divinylbenzene copolymer prepared in Example 1. In addition, the pore distribution curve of the organic porous material of Example 2 measured by the mercury porosimetry method was sharp. The radius (R) of a peak of the pore distribution curve was 2.5 μm, the half-width (W) of the peak was 1.0 μm, and the value (W/R) obtained by dividing the half-width by the radius of the peak was 0.41. The total pore volume of the organic porous material was 8.7 ml/g. To confirm the presence or absence of macrovoids, the organic porous material was cut and the inner conditions were observed by the naked eye. There were no macrovoids observed at all.

EXAMPLE 3

Figure 2:
FIG. 2 is an SEM photograph of the organic porous material obtained in Example 3.

Preparation of Non-Particulate Organic Porous Material Having Chiral Cavities of Spatial Recognizing Sites Produced By Introducing and Succeedingly Removing Optically Active Groups 0.680 g of the organic porous material with optically active groups introduced therein prepared in Example 1 was immersed in n-hexane for one hour to become fully swollen. The swollen organic porous material was then immersed in a mixed solution of trifluoroacetic acid and n-hexane (3:1) for three days at room temperature to cause a reaction to eliminate the pinanylsilyl groups which are an optically active groups. After the reaction, the porous material was immersed in a 1:1 triethylamine/n-hexane (1/1) solution for three days at room temperature for neutralization, followed by purification by Soxhlet extraction using acetone, thereby isolating the product by freeze-drying. The yield was 0.288 g. The progress of the elimination reaction was confirmed by IR spectra. From the fact that the characteristic absorption at 1250 cm$^{-1}$ SiC—H and 1116 cm$^{-1}$ Si—CH$_3$ completely disappeared, the elimination reaction was confirmed to have quantitatively proceeded. The internal structure of the organic porous material after the elimination reaction was observed by SEM, confirming that the continuous porous structure was retained (FIG. 2). The pore volume was 11.9 ml/g, confirming an increase from the pore volume before the reaction (9.7 ml/g).

EXAMPLE 4

Adsorption DL-Mandelic Acid, an Enantiomer, on Organic Porous Material

DL-mandelic acid was dissolved in ethanol to prepare a solution with a concentration of 0.25 wt %. After immersing the organic porous materials manufactured in Example 1 and Example 2 in this solution at room temperature for a specified period of time, adsorbed DL-mandelic acid was desorbed by use of pure ethanol, and the amount of adsorption and selectivity were measured by HPLC using an optically active column. The results are shown in Table 1. As can be seen from Table 1, both organic porous materials into which the optically active groups had been introduced in Example 1 and Example 2 selectively adsorbed S isomers.

TABLE 1

| Organic porous material | Adsorption time (hrs) | Adsorption amount (wt %) | | (S)/(R) |
|---|---|---|---|---|
| | | (S) | (R) | |
| (−)-PSSt copolymer (prepared in Example 1) | 24 | 1.73 | 1.40 | 1.24 |
| (−)-MtSt copolymer (prepared in Example 2) | 3 | 0.80 | 0.73 | 1.10 |

EXAMPLE 5

Adsorption of Trans-Stilbene Oxide in Organic Porous Material

Trans-stilbene oxide was dissolved in acetone or toluene to prepare a solution with a concentration of 0.25 wt %. After immersing the organic porous materials manufactured in Example 1 and Example 3 in this solution at room temperature for a specified period of time, adsorbed trans-stilbene oxide was desorbed using acetone or toluene, and the amount of adsorption and selectivity were measured by HPLC using an optically active column. The results are shown in Table 2.

TABLE 2

| Organic porous material | Adsorption time (hrs) | Desorbent Solvent | Adsorption amount (wt %) | | (S, S)/(R, R) |
|---|---|---|---|---|---|
| | | | (S, S) | (R, R) | |
| (−)-PSSt copolymer (prepared in Example 1) | 24 | Acetone | 2.73 | 1.83 | 1.49 |
| (−)-PSSt copolymer (prepared in Example 1) | 24 | Toluene | 4.54 | 3.45 | 1.32 |
| PSSt eliminated copolymer (prepared in Example 3) | 24 | Acetone | 4.21 | 2.85 | 1.48 |
| PSSt eliminated copolymer (prepared in Example 3) | 24 | Toluene | 6.60 | 5.06 | 1.30 |

As can be seen from Table 2, both organic porous materials prepared in Example 1 and Example 3 selectively adsorbed S isomers. In spite of the absence of optically active groups, the organic porous material obtained in Example 3 exhibited selectivity to S-isomers and the amount of adsorption increased to 1.5 times as much as that of the organic porous material obtained in Example 3 as such. Chiral cavities molecular holes which are spatial recognizing sites of optically active substances were produced by elimination of optically active groups, resulting in a remarkable increase in the specific surface area of the organic porous material. This is presumed to be the reason for the increase in the amount of adsorption.

The invention claimed is:

1. A non-particulate organic porous material having optical resolution capability, the non-particulate organic porous material produced by preparing a mixture of an oil-soluble monomer containing optically active groups, a surfactant, and water, stirring the mixture to prepare a water-in-oil-type emulsion, allowing the water-in-oil-type emulsion to stand to polymerize the monomers to obtain a non-particulate organic porous material having a continuous pore structure, which comprises macropores and mesopores, the macropores being interconnected forming mesopores with a radius of 0.01-100 µm in the interconnected parts, optically active groups being uniformly introduced into the surface and the inside of the skeleton of the non-particulate organic porous material, and eliminating part or all of the optically active groups from the non-particulate organic porous material.

2. The non-particulate organic porous material having optical resolution capability according to claim 1, wherein the total pore volume of the non-particulate organic porous material is 1-50 ml/g.

3. The non-particulate organic porous material having optical resolution capability according to claim 1, wherein micropores which are non-continuous and having an average pore size of 5-800 nm are further formed in the inner wall of the continuous porous structure formed from the macropores and mesopores.

4. The non-particulate organic porous material having optical resolution capability according to claim 1, which is an adsorbent for separating enantiomers.

5. The non-particulate organic porous material according to claim 1, wherein the continuous pore structure selectively absorbs at least one enantiomer of a compound having more than one enantiomer.

6. The non-particulate organic porous material according to claim 1, wherein the continuous pore structure forms spatial recognizing sites that selectively absorb one enantiomer of an optically active substance.

7. The non-particulate organic porous material according to claim 1, wherein the continuous pore structure is formed in a polymer matrix, wherein the polymer matrix comprises at least one organic polymer selected from the group consisting of a polystyrene, a poly(α-methylstyrene), a poly(vinylbenzylchloride), a polyethylene, a polypropylene, a halogenated polyolefin, a polyvinylchloride, a polytetrafluoroethylene, a polyacrylonitrile, and a styrene-divinylbenzene copolymer.

8. The non-particulate organic porous material according to claim 1, wherein the organic porous material consists of an organic polymer selected from the group consisting of a styrene-divinylbenzene copolymer and a vinylbenzylchloride-divinylbenzene copolymer.

9. A non-particulate organic porous material having optical resolution capability and having a continuous pore structure,
wherein the non-particulate organic porous material is produced by preparing a mixture of an oil-soluble monomer containing optically active groups, a surfactant, and water, stirring the mixture to prepare a water-in-oil-type emulsion, allowing the water-in-oil-type emulsion to stand to polymerize the monomers to obtain a non-particulate organic porous material, wherein optically active groups are uniformly introduced into the surface and the inside of the skeleton of the non-particulate organic porous material, and eliminating part or all of the optically active groups from the non-particulate organic porous material;
wherein the pore structure comprises macropores and mesopores uniformly distributed in the organic porous material,
wherein the macropores are interconnected to form mesopores with a radius of 0.01-100 µm in the interconnected parts.

10. The non-particulate organic porous material according to claim 9, wherein the macropores and mesopores are distributed uniformly in the non-particulate organic porous material.

11. The non-particulate organic porous material according to claim 9, wherein the macropores and mesopores are distributed uniformly in the non-particulate organic porous material.

12. The non-particulate organic porous material according to claim 9, wherein the continuous pore structure selectively absorbs at least one enantiomer of a compound having more than one enantiomer.

13. The non-particulate organic porous material according to claim 9, wherein the continuous pore structure forms spatial recognizing sites that selectively absorb one enantiomer of an optically active substance.

14. The non-particulate organic porous material according to claim 9, wherein the continuous pore structure is formed in a polymer matrix, wherein the polymer matrix comprises at least one organic polymer selected from the group consisting of a polystyrene, a poly(α-methylstyrene), a poly(vinylbenzylchloride), a polyethylene, a polypropylene, a halogenated polyolefin, a polyvinylchloride, a polytetrafluoroethylene, a polyacrylonitrile, and a styrene-divinylbenzene copolymer.

15. The non-particulate organic porous material according to claim 9, wherein the organic porous material consists of an organic polymer selected from the group consisting of a styrene-divinylbenzene copolymer and a vinylbenzylchloride-divinylbenzene copolymer.

* * * * *